US009170435B2

(12) United States Patent
Lopez et al.

(10) Patent No.: US 9,170,435 B2
(45) Date of Patent: Oct. 27, 2015

(54) METHOD OF FORMING A GRID DEFINING A FIRST RELATIVE REFERENCE FRAME

(71) Applicant: GE Aviation Systems LLC, Grand Rapids, MI (US)

(72) Inventors: James Gerard Lopez, East Schodack, NY (US); Jerry Lynne Page, Alto, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 280 days.

(21) Appl. No.: 13/794,923

(22) Filed: Mar. 12, 2013

(65) Prior Publication Data
US 2014/0268269 A1    Sep. 18, 2014

(51) Int. Cl.
| | |
|---|---|
| *G02B 26/08* | (2006.01) |
| *G02F 1/01* | (2006.01) |
| *G02B 26/10* | (2006.01) |
| *G01S 1/70* | (2006.01) |
| *G02B 27/28* | (2006.01) |
| *G05D 1/00* | (2006.01) |
| *G02B 26/02* | (2006.01) |
| *G01S 5/16* | (2006.01) |

(52) U.S. Cl.
CPC ... *G02F 1/01* (2013.01); *G01S 1/70* (2013.01); *G02B 26/105* (2013.01); *G02B 27/283* (2013.01); *G02B 27/286* (2013.01); *G05D 1/00* (2013.01); *G01S 5/16* (2013.01); *G02B 26/02* (2013.01)

(58) Field of Classification Search
CPC ....... G02B 26/105; G02F 1/01; G02F 1/0136; G01C 21/00
USPC ............ 359/199.1–202.1, 204.2–204.3, 359/212.1–214.1, 238; 33/228
See application file for complete search history.

(56) References Cited

U.S. PATENT DOCUMENTS

| | | | |
|---|---|---|---|
| 4,441,669 A | 4/1984 | Wich | |
| 6,441,367 B1 | 8/2002 | Gladnick | |
| 7,681,839 B2 | 3/2010 | Mickley et al. | |
| 8,352,100 B2 * | 1/2013 | Stimac et al. | 701/4 |
| 2011/0153205 A1 | 6/2011 | Stimac et al. | |

FOREIGN PATENT DOCUMENTS

| | | |
|---|---|---|
| EP | 2703777 A2 | 3/2014 |
| WO | 9519031 A1 | 7/1995 |
| WO | 9618080 A2 | 6/1996 |
| WO | 2003067351 A2 | 8/2003 |

OTHER PUBLICATIONS

Combined Search and Examination Report issued in connection with corresponding GB Application No. GB1404255.0 dated Aug. 13, 2014.

* cited by examiner

*Primary Examiner* — James Phan
(74) *Attorney, Agent, or Firm* — General Electric Company; William S. Munnerlyn

(57) ABSTRACT

A method of projecting into space, from a first object, a plurality of modulated lines to form a grid defining a first relative reference frame, the method includes projecting polarized light having a first orientation to form a horizontal grid line projecting from the first object and projecting polarized light having a second orientation different than the first orientation to from a vertical grid line projecting from the first object and modulating the horizontal grid line and the vertical grid line to carry first and second grid words, respectively.

19 Claims, 3 Drawing Sheets

METHOD OF FORMING A GRID DEFINING A FIRST RELATIVE REFERENCE FRAME

BACKGROUND OF THE INVENTION

Relative navigation systems are useful for various applications such as autonomous vehicle navigation such as in a warehouse or factory environment, mid-air refueling, and space docking. In some applications, only the range between two objects is required. In other applications, both the range and the relative attitude (pitch, yaw, and roll) between two objects are required. In such applications high reliability, low weight, and low cost may be desirable.

BRIEF DESCRIPTION OF THE INVENTION

In one embodiment, the invention relates to a method of projecting into space, from a first object, a plurality of modulated lines to form a grid defining a first relative reference frame, the method includes projecting polarized light having a first orientation to form a horizontal grid line projecting into space from the first object, projecting polarized light having a second orientation different than the first orientation to form a vertical grid line projecting into space from the first object, modulating the horizontal grid line to carry a first grid word comprised of a number of modulated bits to identify the horizontal grid line within the grid by the modulated first grid word, and modulating the vertical grid line to carry a second grid word, different than the first grid word, comprised of a number of modulated bits to identify the horizontal grid line within the grid by the modulated second grid word.

DESCRIPTION OF EMBODIMENTS OF THE INVENTION

Figure 1:
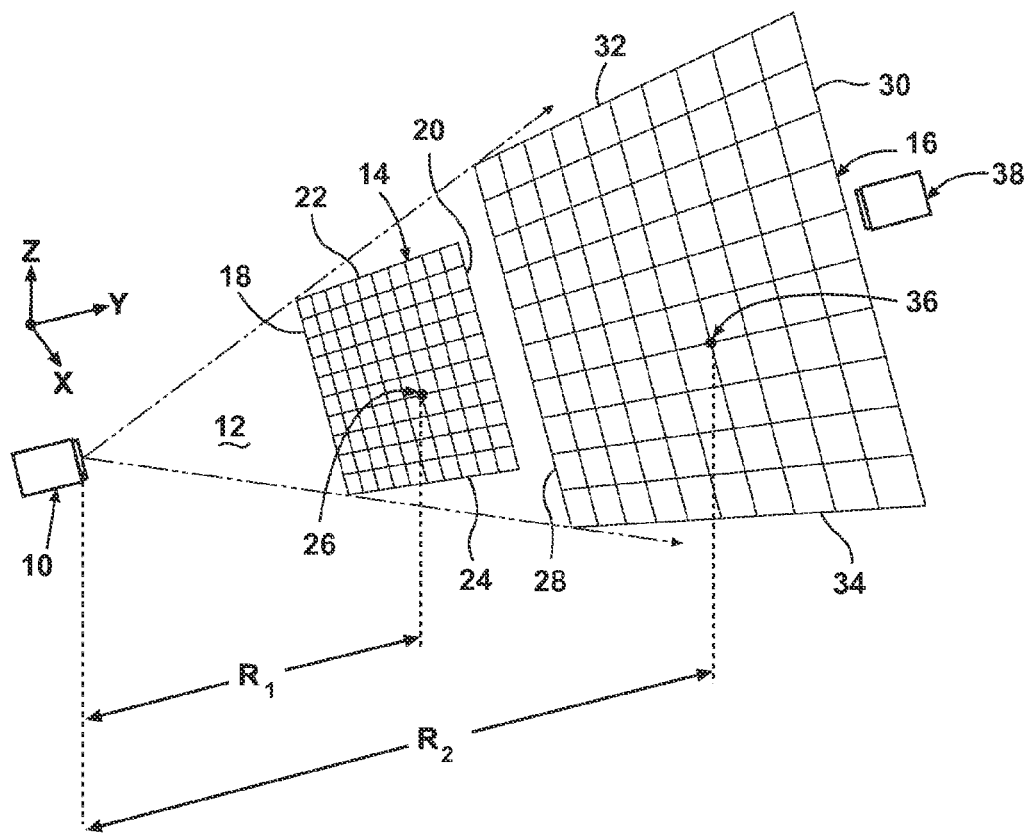
FIG. 1 is a schematic illustration of first and second objects, each having their own relative reference frame, and capable of navigation according to an embodiment of the invention.

FIG. 1 illustrates a first object or grid generator 10, which projects a grid, such as a plurality of intersecting lines, into space within a field of transmission 12. As illustrated, the projected grid comprises intersecting lines. At some distance away from the grid generator 10, these intersecting lines are observed as a grid in space, with the size of the grid increasing away from the grid generator 10.

For description purposes, the grid generator 10 may be thought of as projecting intersecting lines substantially in the y direction of the illustrated coordinate system. If one were to observe the projection of intersecting lines in the x-z plane at some distance $R_1$ away from the grid generator 10, one would observe a first grid 14. If one were to observe the same projection of intersecting lines at a distance $R_2$, which is greater than the first distance $R_1$ in the x-z plane, one would observe a second grid 16, which appears relatively larger than the first grid 14.

The first grid 14 at distance $R_1$ away from the grid generator 10 is spatially bound in the horizontal direction by a first vertical line 18 and a second vertical line 20. There exists a plurality of vertical lines spatially and temporally generated in between the first vertical line 18 and the second vertical line 20. The first grid 14 at a distance $R_1$ away from the grid generator 10 is spatially bound in the vertical direction by a first horizontal line 22 and a second horizontal line 24. There exists a plurality of horizontal lines spatially and temporally between the first horizontal line 22 and the second horizontal line 24. The distance $R_1$ can be any distance between the first grid 14 and the grid generator 10. For convenience, the distance is determined between a point 26 on the first grid 14 and the grid generator 10 as shown.

The second grid 16 at distance $R_2$ away from the grid generator 10 is for all practical purposes the same as the first grid 14, but at a further distance from the grid generator 10 than the first grid 14. The second grid 16 is spatially bound in the horizontal direction by a first vertical line 28 of the second grid 16 and a second vertical line 30 of the second grid 16. There exists a plurality of vertical lines spatially and temporally generated in between the first vertical line 28 of the second grid 16 and the second vertical line 30 of the second grid 16. The second grid 16 at a distance $R_2$ away from the grid generator 10 is spatially bound in the vertical direction by a first horizontal line 32 of the second grid 16 and a second horizontal line 34 of the second grid 16. There exists a plurality of horizontal lines spatially and temporally between the first horizontal line 32 of the second grid and the second horizontal line 34 of the second grid 16. A point 36 on the second grid 16 is shown.

The similarity of the grids 14 and 16 becomes apparent in the case of projected grid lines, where the second grid 16 is formed by the same lines forming the first grid 14, except the second grid 16 is observed at a further distance from the grid generator 10, making the second grid 16 appear larger than the first grid 14. In this sense, the second grid 16 is the appearance of the grid lines generated by the grid generator 10 at the distance $R_2$ whereas the first grid 14 is the appearance of the grid lines at the distance R1.

The grids 14 and 16 may be of any number of lines. As illustrated, they are comprised of ten vertical lines by ten horizontal lines. A grid comprised of a greater number of intersecting lines may result in improved detection angular resolution for a fixed field of transmission 12 and distance from the grid generator 10 than a grid comprised of a fewer number of intersecting lines. The grids 14 and 16 are depicted as a square shape, but this is not a requirement for the methods and apparatus of this invention. The grid can be any shape including rectangular, oval, or circular. Furthermore, the intersecting lines of the grids 14 and 16 are depicted as orthogonal; however, this is not a requirement for the methods and apparatus of the present invention. The angles between the intersecting lines may be right angles, acute angles, or obtuse angles in different parts of the grid.

Although, examples shown use Cartesian coordinates, any appropriate coordinate system may be used including polar, cylindrical, or spherical coordinate systems for both grid generation and for grid detection. For example, to form a grid amenable to polar coordinate representation, a series of concentric circles and lines radiating out from the center of those circles may be projected by the grid generator into space.

A second object or detector module 38 may lie within the field of transmission 12 of the grid generator 10, enabling the detector module 38 to "see" the grid. The detector module 38 may be configured in any suitable manner to "see" the grid.

Figure 2:
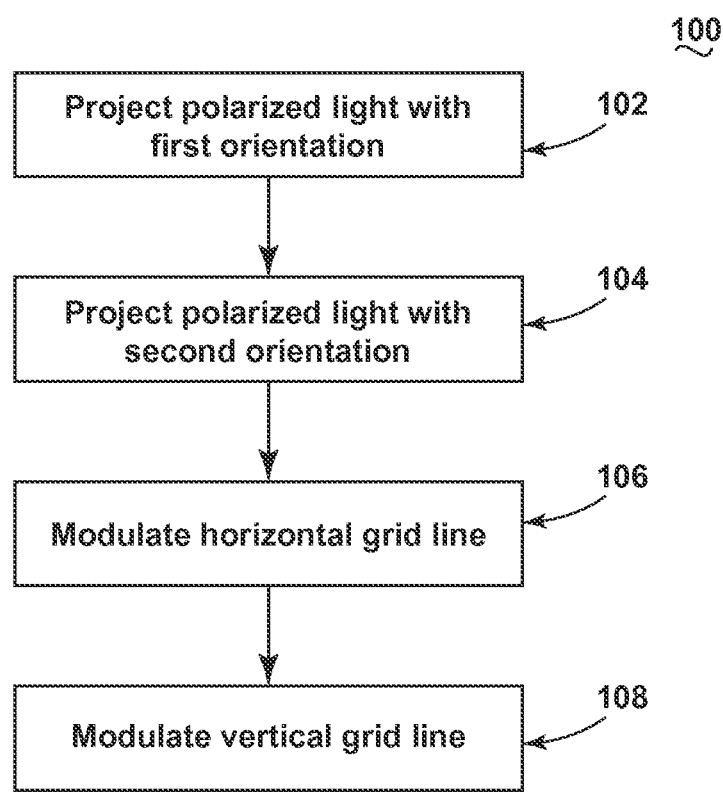
FIG. 2 is a flow chart showing a method of projecting into space a grid according to an embodiment of the invention.

Embodiments of the invention include projecting into space, from a first object or grid generator, a plurality of modulated lines to form a grid defining a first relative reference frame. In accordance with an embodiment of the invention, FIG. 2 illustrates a method 100, which may be used for projecting a grid into space. It will be understood that the term "space" is not limited to outer space and that the grid may be projected into any suitable space including indoors and outdoors. The method 100 begins at 102 with projecting polarized light having a first orientation to form a horizontal grid line projecting from the first object. At 104, polarized light having a second orientation, different than the first orientation, may be projected to form a vertical grid line projecting from the first object. The horizontal grid line and the vertical grid line may intersect to form a portion of the grid.

As the term polarization is used in this description, it is meant to refer to the polarization state of light as defined by the orientation of its electric field as the light wave propagates. Light polarization states may vary by any desired degree of variation in the two orientations. However, for ease of use, two different orientations may be selected as orthogonal pairs such that one polarization may be blocked with an appropriately designed polarization filter or polarizer and still allow the corresponding orthogonal polarization to be transmitted.

For example, linearly polarized light can have its electric field polarized vertically or horizontally. Thus, the first orientation may be horizontal and the second orientation may be vertical. Since the two electric field vectors are perpendicular or orthogonal they cannot interfere with each other and can be blocked or transmitted by a linear polarizer depending on the alignment of the polarization axes.

The horizontal grid line may be modulated to carry a first grid word comprised of a number of modulated bits to identify the horizontal grid line within the grid by the modulated grid word at 106 and modulating the vertical grid line to carry a second grid word comprised of a number of modulated bits to identify the horizontal grid line within the grid by the modulated grid word at 108. The second grid word may be different from the first grid word. For example, by grid word, it is meant that the structure or characteristic of the grid provides data or information that may be read or detected by the detector module. Additionally, the grid word could be comprised of any number of bits, including any number of start or stop bits, data bits, or error checking, correction or parity bits. The data bits may encode the vertical and horizontal lines with a unique sequence of bits. Upon detection of these bits by the detector module and processing by the processor, microcontroller, or other circuitry, the location within the grid can be determined. Any number of known modulation methods could be used for encoding the grid words on to the horizontal grid line and the vertical grid line, including but not limited to, amplitude modulation (AM), frequency modulation (FM), quadrature amplitude modulation (QAM), or combinations thereof. One manner of encoding of the grid word is by modulating the beam being used to form the lines. Modulation may be achieved by changing the intensity of the beam and/or blocking the beam with some periodicity.

It will be understood that the method of forming a grid is flexible and that the method 100 illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from the embodiments of the invention. For example, the method 100 may include projecting into space additional intersecting horizontal and vertical grid lines to form additional portions of the grid. The additional intersecting horizontal and vertical grid lines may be physically spaced from each other in space. Such additional lines may also be modulated. More specifically, as each of these lines scan across space, the light may be modulated with a unique code synchronized with the position of the light during each of the vertical and horizontal scans. This describes a two dimensional grid of points, with each point uniquely represented by a horizontal and vertical component resulting from the sequential horizontal and vertical scans. Each of the intersecting projected lines could be encoded differently or a grouping of intersecting lines could be encoded similarly.

Figure 3:
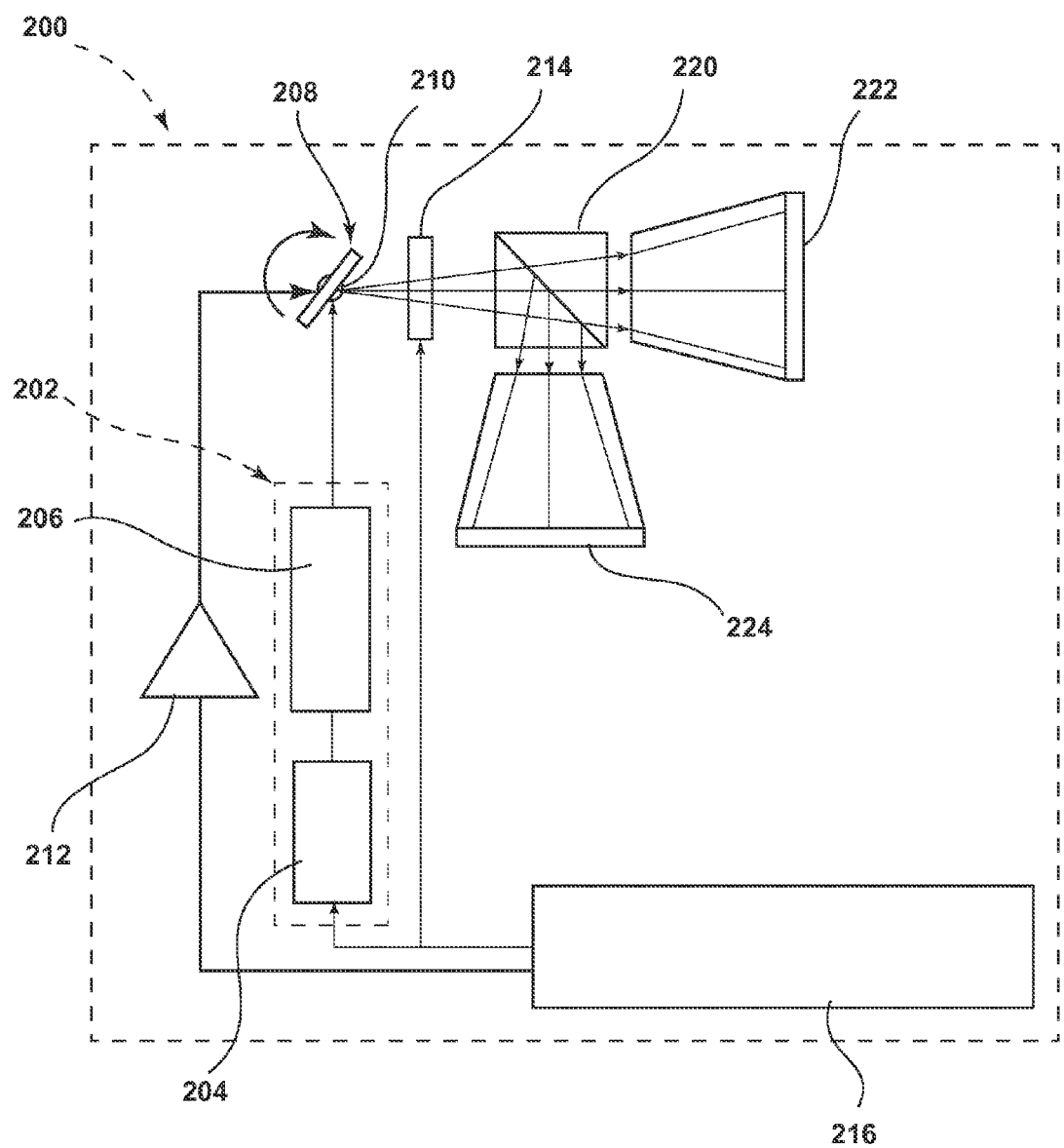
FIG. 3 is a schematic view of a grid generator that is capable of projecting a horizontal grid line and a vertical grid line according to an embodiment of the invention.

FIG. 3 illustrates a grid generator 200 capable of operating according to an embodiment of the method of 100. A beam generator 202 including a laser 204 and a beam shaper 206 may be included as well as a galvanometer 208 having a mirror 210, a galvanometer drive 212, a rotating polarizer or polarization rotator 214, a synchronizer 216, a polarizing beam splitter 220, a first mirror 222, and a second mirror 224. While the beam generator 202 has been illustrated as including a laser 204 and a beam shaper 206, the beam generator 202 may include any suitable illumination source. In the illustrated example, the horizontal grid line and the vertical grid line may be projected from an illumination source, such as the laser 204, which emits a single beam of light. Alternatively, the horizontal grid line and the vertical grid line may be projected from two illumination sources or an illumination source projecting two beams of light.

The galvanometer 208 having the mirror 210 may be utilized to scan the single beam of light from the beam generator 202 to form at least one of the horizontal and vertical grid lines. More specifically, the galvanometer drive 212 may move the galvanometer 208 such that the galvanometer 208 may scan the beam along portions of the beam splitter 220. The polarization rotator 214 is an optical device that rotates the polarization axis of a linearly polarized light beam by an angle of choice. The polarization rotator 214 may be electronically controlled and may be inserted in the laser beam path either before the galvanometer 208 or immediately after the galvanometer 208. The placement of the polarization rotator 214 before the galvanometer 208 may be preferred in order to maintain a zero degree incidence angle to the polarization rotator 214 while scanning for best polarization performance. In the illustrated example, the synchronizer 216 may be utilized to control the modulation, galvanometer scan angle, polarization control, and electronic synchronization for the grid generator 200.

The beam splitter 220 may be a polarizing cube beam splitter such as a Wollaston prism. Such a beam splitter 220 has the property of transmitting one state of linear polarization straight through the cube and reflecting the orthogonal linear polarization state with a 90 degree deflection angle from the cube diagonal interface. The first and second mirrors 222 and 224 may be utilized to direct the polarized horizontal grid line and the polarized vertical grid line in the same direction and in the same plane.

During operation, the laser 204 creates a beam of light that is transmitted through the beam shaper 206 and is reflected from the mirror 210 that is being rotated by the galvanometer 208. The galvanometer 208 accomplishes the spatial beam scanning function. The light emerging from the beam generator 202 may be polarized to a high degree. Alternatively, a polarizer may be inserted somewhere between the laser 204 and the polarization rotator 214 such that the beam of light may be polarized when it passes through the polarizer. The polarization rotator 214 operates by aligning the input polarization to the polarizing beam splitter 220 alternately along the two polarization axes of the polarizing beam splitter 220 under the control of an electronic drive signal, which is synchronized with the galvanometer drive 212 and the laser modulation by the synchronizer 216.

The polarizing beam splitter 220 is in the path of the beam reflected from the rotating galvanometer 208 and through the polarization rotator 214. Depending on the polarization of the light from the polarization rotator 214, the polarizing beam splitter 220 will transmit the beam through the polarizing beam splitter 220 or the beam will be reflected at the polarizing beam splitter 220 diagonal interface. Thus, the beam of light may be alternately transmitted or reflected by the polarizing beam splitter 220 by passing the beam of light through the polarization rotator 214 which alternately rotates the polarization of the light from galvanometer 208 to polarizing beam splitter 220 and thus creating the alternating horizontal grid line and vertical grid line emerging from the polarizing beam splitter 220.

It will be understood that, projecting the polarized light having the first orientation may include projecting a polarized beam of light having a first orientation and projecting the polarized light having the second orientation may include projecting a polarized beam of light having a second orientation. The polarized beam of light having the first orientation may be reflected from a diagonal interface of the polarized beam splitter 220 to form the horizontal grid line and the polarized beam of light having the second orientation may be passed through the polarized beam splitter to form the vertical grid line. In this manner, polarized light having a first orientation may be projected to form a horizontal grid line projecting into space from the grid generator and polarized light having a second orientation different than the first orientation may be projected to form a vertical grid line projecting into space from the grid generator.

Depending on the input alignment from the polarization rotator 214 to the polarizing beam splitter 220, the light is either transmitted to the first mirror 222 or to the second mirror 224. The first mirror 222 is placed in the path of the beam transmitted through the polarizing beam splitter 220. The first mirror 222 in the illustrated example may be oriented so that the scanning beam is transmitted out of the figure page, toward the viewer. The scanning motion will be vertical from the perspective of the viewer. The second mirror 224 is placed in the path of the beam reflected from the polarizing beam splitter 220 and oriented similar to the first mirror 222 except rotated 90 degrees clockwise. The second mirror 224 may be orientated such that the scanning beam is also reflected outward from the figure page. The beam has a scanning motion that is horizontal and the beam shape is also rotated 90 degrees from the vertical scanning beam. Thus, two parallel beams are alternately created with each scanning in differing directions: vertical and horizontal, respectively. The corresponding beam shapes are also rotated 90 degrees from each other. After reflection from the first and second mirrors 222 and 224, the two parallel beams forming the horizontal grid line and the vertical grid line may include polarized light having the same orientation.

The above described embodiments provided a variety of benefits including that the embodiments allow for the horizontal and vertical grid lines to be projected where the horizontal and vertical grid lines comprise polarized light having differing orientations. This may allow for an extremely small and compact grid generator to be utilized to transmit such grid lines, which may allow for a lower cost grid generator that may fit uniquely in small spaces.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of projecting into space, from a first object, a plurality of modulated lines to form a grid defining a first relative reference frame, the method comprising:
    projecting polarized light having a first orientation to form a horizontal grid line projecting into space from the first object;
    projecting polarized light having a second orientation different than the first orientation to form a vertical grid line projecting into space from the first object;
    modulating the horizontal grid line to carry a first grid word comprised of a number of modulated bits to identify the horizontal grid line within the grid by the modulated first grid word; and
    modulating the vertical grid line to carry a second grid word comprised of a number of modulated bits to identify the horizontal grid line within the grid by the modulated second grid word.

2. The method of claim 1 wherein the horizontal grid line and the vertical grid line intersect to form a portion of the grid.

3. The method of claim 2, further comprising projecting into space additional intersecting horizontal and vertical grid lines to form additional portions of the grid.

4. The method of claim 3 wherein the additional intersecting horizontal and vertical grid lines are physically spaced from each other in space.

5. The method of claim 1 wherein the projecting the horizontal grid line and the vertical grid line comprises projecting from an illumination source emitting a single beam of light.

6. The method of claim 5, further comprising passing the single beam of light through a beam shaper.

7. The method of claim 5 wherein the illumination source is a laser.

8. The method of claim 5 wherein the projecting the lines further comprises utilizing a galvanometer to scan the beam of light to form at least one of the horizontal and vertical grid lines.

9. The method of claim 8 wherein the single beam of light is polarized to form the least one of the horizontal and vertical grid lines with polarized light.

10. The method of claim 8, further comprising polarizing the beam of light by passing the beam of light through a polarizer.

11. The method of claim 10, further comprising alternately polarizing the beam of light by passing the beam of light through a polarization rotator.

12. The method of claim 11, further comprising alternately projecting the horizontal grid line and the vertical grid line in sync with the alternate polarization of the beam of light.

13. The method of claim 1 wherein projecting the polarized light having the first orientation comprises projecting a polarized beam of light having a first orientation.

14. The method of claim 13 wherein the polarized beam of light having the first orientation is reflected from a diagonal interface of a polarized beam splitter to form the horizontal grid line.

15. The method of claim 14 wherein projecting the polarized light having the second orientation comprises projecting a polarized beam of light having a second orientation.

16. The method of claim 15 wherein the polarized beam of light having the second orientation is passed through the polarized beam splitter to form the vertical grid line.

17. The method of claim 16, further comprising transmitting the horizontal grid line and the vertical grid line to mirrors to direct the horizontal grid line and the vertical grid line along in the same direction and within the same plane.

18. The method of claim 1 wherein the second word is different from the first word.

19. The method of claim 1 wherein the horizontal grid line and the vertical grid line comprise polarized light having the same orientation.

* * * * *